(12) United States Patent
Do et al.

(10) Patent No.: US 12,126,928 B2
(45) Date of Patent: Oct. 22, 2024

(54) COLUMN READOUT AMPLIFIER FOR IMAGE SENSORS

(71) Applicant: BAE Systems Imaging Solutions Inc., San Jose, CA (US)

(72) Inventors: Hung T. Do, San Jose, CA (US); Khai Nguyen, Stockton, CA (US); Alexander Lu, San Jose, CA (US); Stephen W. Mims, San Diego, CA (US); Kwang Bo Cho, San Jose, CA (US); Angel Rogelio Lopez, Newark, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 125 days.

(21) Appl. No.: 18/147,903

(22) Filed: Dec. 29, 2022

(65) Prior Publication Data

US 2024/0223920 A1    Jul. 4, 2024

(51) Int. Cl.
H04N 25/78    (2023.01)

(52) U.S. Cl.
CPC .................................. *H04N 25/78* (2023.01)

(58) Field of Classification Search
CPC ...................................................... H04N 25/78
See application file for complete search history.

(56) References Cited

U.S. PATENT DOCUMENTS

| | | | |
|---|---|---|---|
| 10,484,618 B1 | 11/2019 | Do et al. | |
| 2006/0097782 A1* | 5/2006 | Ebner | H03F 1/34 330/85 |
| 2012/0212288 A1 | 8/2012 | Masui et al. | |
| 2015/0076321 A1* | 3/2015 | Fowler | H04N 25/75 330/294 |
| 2015/0381129 A1* | 12/2015 | Brekelmans | H03G 3/18 330/254 |

(Continued)

OTHER PUBLICATIONS

Texas Instruments—John Caldwell, May 7, 2014, "Part I—What op amp bandwidth do I need? (Transimpedance Amplifiers)", retrieved from https://e2e.ti.com/blogs_/archives/b/precisionhub/posts/transimpedance-amplifiers-what-op-amp-bandwidth-do-i-need-part-i on Jun. 12, 2024 (Year: 2014).*

(Continued)

*Primary Examiner* — Timothy J Henn
(74) *Attorney, Agent, or Firm* — Scott J. Asmus (57) ABSTRACT

Examples include column readout amplifiers and image sensors including same. In one example, a column readout amplifier includes a signal amplifier having an amplifier output and first and second amplifier inputs, a filter capacitor having first and second terminals, the second terminal connected to a ground terminal, a buffer amplifier having a buffer amplifier input and a buffer amplifier output, a switching network configured to switchably connect the amplifier output to the buffer amplifier input and the buffer amplifier output to the first terminal of the filter capacitor during a first time period, and to switchably connect the amplifier output directly to the first terminal of the filter capacitor during a second time period, and a low-pass filter connected in a feedback path of the signal amplifier between the amplifier output and the first amplifier input, the low-pass filter including a series resistor and a capacitor.

20 Claims, 6 Drawing Sheets

(56) References Cited

U.S. PATENT DOCUMENTS

2020/0228731 A1* 7/2020 Do ........................ H04N 25/75
2023/0232132 A1* 7/2023 Xhakoni .............. H04N 25/532
 348/300

OTHER PUBLICATIONS

Analog Devices, Feb. 3, 2012, "Stabilize Your Transimpedance Amplifier", retrieved from https://www.analog.com/en/resources/technical-articles/stabilize-transimpedance-amplifier-circuit-design.html on Jun. 12, 2024 (Year: 2012).*

Texas Instruments Analog Engineer's Circuit, Jan. 2019, "Transimpedance Amplifier Circuit" (Year: 2019).*

Aspencore Inc. Passive Low Pass Filter—Passive RC Filter Tutorial. Electronics Tutorials, Nov. 17, 2022, pp. 1-17 [retrieved online Mar. 26, 2024]. Retrieved from [URL: https://web .archive .org/web/20221117182753/https://www.electronics-tutorials.ws/filter/filter _ 2.h tml].

International Search Report, PCT/US23/85985, mailed Apr. 10, 2024, 9 pages.

* cited by examiner

COLUMN READOUT AMPLIFIER FOR IMAGE SENSORS

BACKGROUND

Image sensors, such as CMOS image sensors, are widely used for a number of different applications across a large portion of the electromagnetic spectrum. Many image sensor designs use a two-dimensional array of sensors to capture impinging light across a given area. Each sensor may be considered a single pixel of the sensor array, with the pixels arranged in any number of rows and columns. Each pixel sensor includes some form of photodetector as well as a readout circuit that converts the charge accumulated by the photodetector ("photocharge") during the image exposure to a voltage that is read out by a readout amplifier shared by all of the pixel sensors in a column (and thus referred to as a column readout amplifier). The pixel sensors in each row are read out in parallel using the column readout amplifiers.

To maintain low noise, the time between the transfer of the photocharge to the readout circuits in the pixel sensors and the readout of that charge must be as small as possible, since noise accumulates in the pixel sensors during this phase. To limit the noise in the column readout amplifiers, a low bandwidth amplifier can be utilized. The lower the bandwidth of the column readout amplifier, the lower the readout noise from the column readout amplifier. However, lowering the bandwidth of the column readout amplifier results in an increase in the time required to read out the pixel sensor(s), since the reduced bandwidth amplifier takes longer to settle. Hence, there is a tradeoff between readout time and readout noise. Accordingly, reducing the noise in column readout amplifiers remains a challenge in image sensors.

SUMMARY

Aspects and embodiments are directed to column readout amplifiers and methods for using the same. In particular, certain aspects are directed to a column readout amplifier circuit that incorporates low pass filtering in the feedback path of the amplifier to reduce readout noise.

According to one embodiment, a column readout amplifier comprises a signal amplifier having an amplifier output, a first amplifier input, and a second amplifier input, the second amplifier input being connected to a reference voltage terminal, a filter capacitor having first and second terminals, the second terminal being connected to a ground terminal, and a buffer amplifier having a buffer amplifier input and a buffer amplifier output. The column readout amplifier further comprises a switching network configured to switchably connect the amplifier output to the buffer amplifier input and the buffer amplifier output to the first terminal of the filter capacitor during a first time period, and to switchably connect the amplifier output directly to the first terminal of the filter capacitor during a second time period, and a low-pass filter connected in a feedback path of the signal amplifier between the amplifier output and the first amplifier input, the low-pass filter including a series resistor and a capacitor.

According to another embodiment, an image sensor comprises a bit line conductor, a pixel array having at least one column of addressable pixel sensors, each pixel sensor being coupled to the bit line conductor in response to a word select signal, and a column amplifier connected to the bit line conductor. The column amplifier comprises a signal amplifier having an amplifier output, a first amplifier input, and a second amplifier input, the second amplifier input being connected to a reference voltage terminal, a filter capacitor having first and second terminals, the second terminal being connected to a ground terminal, a buffer amplifier having a buffer amplifier input and a buffer amplifier output, a switching network configured to switchably connect the amplifier output to the buffer amplifier input and the buffer amplifier output to the first terminal of the filter capacitor during a first time period, and to switchably connect the amplifier output directly to the first terminal of the filter capacitor during a second time period, and a low-pass filter connected in a feedback path of the signal amplifier between the amplifier output and the first amplifier input, the low-pass filter including a series resistor and a capacitor.

Examples of the column amplifier and of the image sensor may include any one or more of the following features.

In one example, the column readout amplifier further comprises a capacitor connected between the amplifier output and the ground terminal.

In another example, the column readout amplifier further comprises a feedback capacitor connected in series with the series resistor in the feedback path of the signal amplifier.

In one example, the signal amplifier comprises a capacitive transimpedance amplifier configured with a gain greater than one.

In another example, the capacitor is connected between a node between the series resistor and the feedback capacitor and the ground terminal.

In another example, a capacitance of the capacitor is smaller than a capacitance of the filter capacitor.

In another example, the capacitance of the filter capacitor is variable.

In one example, the buffer amplifier output is disconnected from the filter capacitor during the second time period.

In another example, the buffer amplifier has a gain substantially equal to one.

In another example, the column readout amplifier further comprises an input capacitor connected to the first input of the signal amplifier.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

DETAILED DESCRIPTION

Structures are disclosed for a column readout amplifier that exhibits reduced noise, particularly at high readout frame rates, with no or relatively little increase in power consumption. Embodiments of the column readout amplifier may include low-pass filtering circuitry in the feedback path of the amplifier to reduce readout noise, as discussed in more detail below. In an example, the column readout amplifier can be used with image sensors that include an array of photosensitive pixel sensors.

General Overview

Image sensors that operate at high frame rate generally need a high bandwidth column readout amplifier in order to let the amplifier output well settle in the short readout time available at the high frame rate. As discussed above, however, the higher the bandwidth of the column readout amplifier, the higher the readout noise from the column readout amplifier. Higher readout noise can be problematic in several imaging applications, particularly those in which the image sensor may be operating in very low light conditions.

Accordingly, techniques are disclosed herein for designing a column readout amplifier that exhibits reduced readout noise at both high and low readout frame rates. According to certain examples, the column amplifier includes a low-pass filter in the amplifier feedback path. This helps to reduce the readout noise by about 10 percent at higher frame rates (e.g., rates of around 120 frames per second (fps)) and about 5 percent at lower frame rates (e.g., rates of around 30 fps) with the same power consumption.

According to some embodiments, an image sensor includes a pixel array having at least one column of addressable pixel sensors, and a column readout amplifier coupled to the at least one column of addressable pixel sensors. The column readout amplifier may include a signal amplifier having an amplifier output, a first amplifier input, and a second amplifier input, the second amplifier input being connected to a reference voltage terminal, and a filter capacitor having first and second terminals, the second terminal being connected to a ground terminal. The column readout amplifier may further include a buffer amplifier having a buffer amplifier input and a buffer amplifier output, and a switching network configured to switchably connect the amplifier output to the buffer amplifier input and the buffer amplifier output to the first terminal of the filter capacitor during a first time period, and to switchably connect the amplifier output directly to the first terminal of the filter capacitor during a second time period. The column readout amplifier may further include a low-pass filter connected in a feedback path of the signal amplifier between the amplifier output and the first amplifier input, the low-pass filter including a series resistor and a capacitor.

System Architecture

Figure 1:
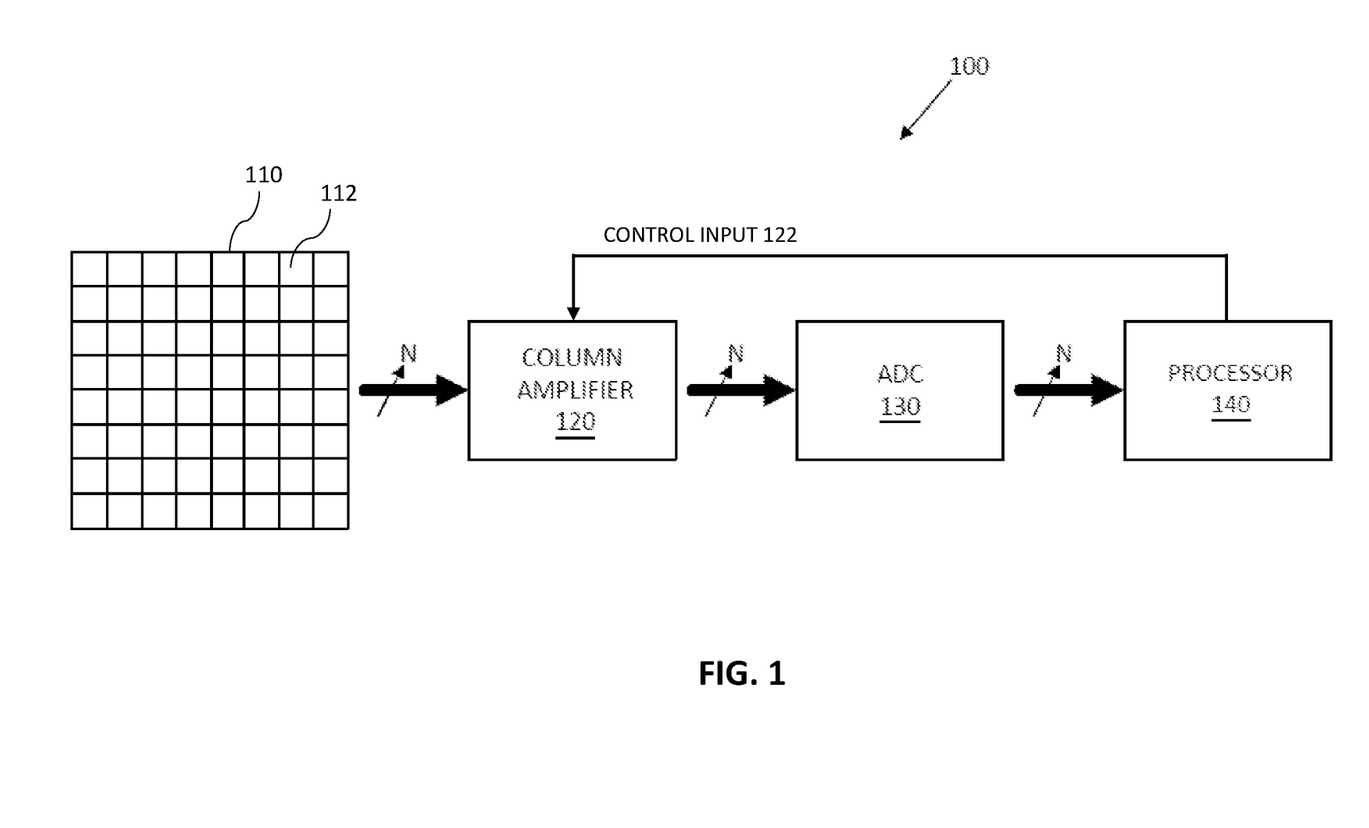
FIG. 1 is a block diagram of one example of an image sensor system that uses a pixel array and a column readout amplifier, in accordance with aspects of the present disclosure.

FIG. 1 is a block diagram of an example of an image sensor 100, according to some embodiments. The image sensor 100 may represent or be an integral part of a charge coupled device (CCD) camera or other type of imaging device. In some embodiments, the image sensor 100 may be configured for capturing different portions of the electromagnetic spectrum, such as visible light, ultraviolet radiation, infrared radiation, or x-rays, to name a few examples. The image sensor 100 may include a pixel array 110, a column readout amplifier 120, an analog-to-digital converter (ADC) 130, and a processor 140. Each of the illustrated components may be included together on same printed circuit board (PCB) or together in a single chip package (e.g., a system-in-package or system-on-chip). In some other embodiments, any one or more of the elements may be provided in a separate chip package and/or on separate PCBs.

According to some embodiments, the pixel array 110 includes a plurality of pixel sensors 112 arranged in a row-column format. Each pixel sensor 112 of the pixel array 110 may have a similar architecture that includes a photodetector and a readout circuit. The photo detection area of each pixel sensor on which incident radiation may impinge may vary from one embodiment to the next, but in some example cases has a physical size of around 1 m×1 m up to around 5 m×5 m. Likewise, the shape and lensing (if present) of the photo detection area (e.g., photo diode) can also vary from one example to the next, depending on factors such as desired fill factor of the array. According to some embodiments, each row of pixel sensors may be coupled together via a common row-select line (e.g., a wordline), to provide separately addressable rows of pixel sensors.

According to some embodiments, the outputs from N different columns of pixel sensors 112 are received by the column readout amplifier 120. According to some embodiments, the column readout amplifier 120 represents N separate column readout amplifiers with a given column readout amplifier configured to receive the output from a corresponding column of pixel sensors from the pixel array 110. In this way, a given row of pixel sensors from the pixel array 110 can be selected via a row-select line and simultaneously read out via the N column readout amplifiers 120. According to some embodiments, the column readout amplifier 120 may include any type of amplifier configuration, such as any number of source follower FETs or operational amplifiers. In some embodiments, a single column readout amplifier 120 may be used in conjunction with a multiplexer to receive each of the N column outputs from the pixel array 110.

According to some embodiments, the output(s) from the column readout amplifier 120 is/are received by the ADC 130. As noted above, the ADC 130 may represent N different ADCs with a given ADC configured to receive the output from a corresponding column readout amplifier 120. The ADC 130 may be any known type of ADC without limitation.

The processor 140 may be configured to receive the digitized signal from the ADC 130 (or N digitized signals across N ADCs) and perform any number of operations with the signal(s). For example, the processor 140 may receive the signal data from a given row of pixel sensors of the pixel array 110 and use the signal data to create an image or a portion of an image captured via the pixel array 110. According to some embodiments, the processor 140 may provide a control input 122 to the column readout amplifier to change an operating mode of the amplifier, as discussed further below. As used herein, the term "processor" may refer to any device or portion of a device that processes electronic data from registers and/or memory to transform that electronic data into other electronic data that may be stored in registers and/or memory. The processor 140 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, custom-built semiconductor, or any other suitable processing devices.

Column Readout Amplifier Design

Figure 2:
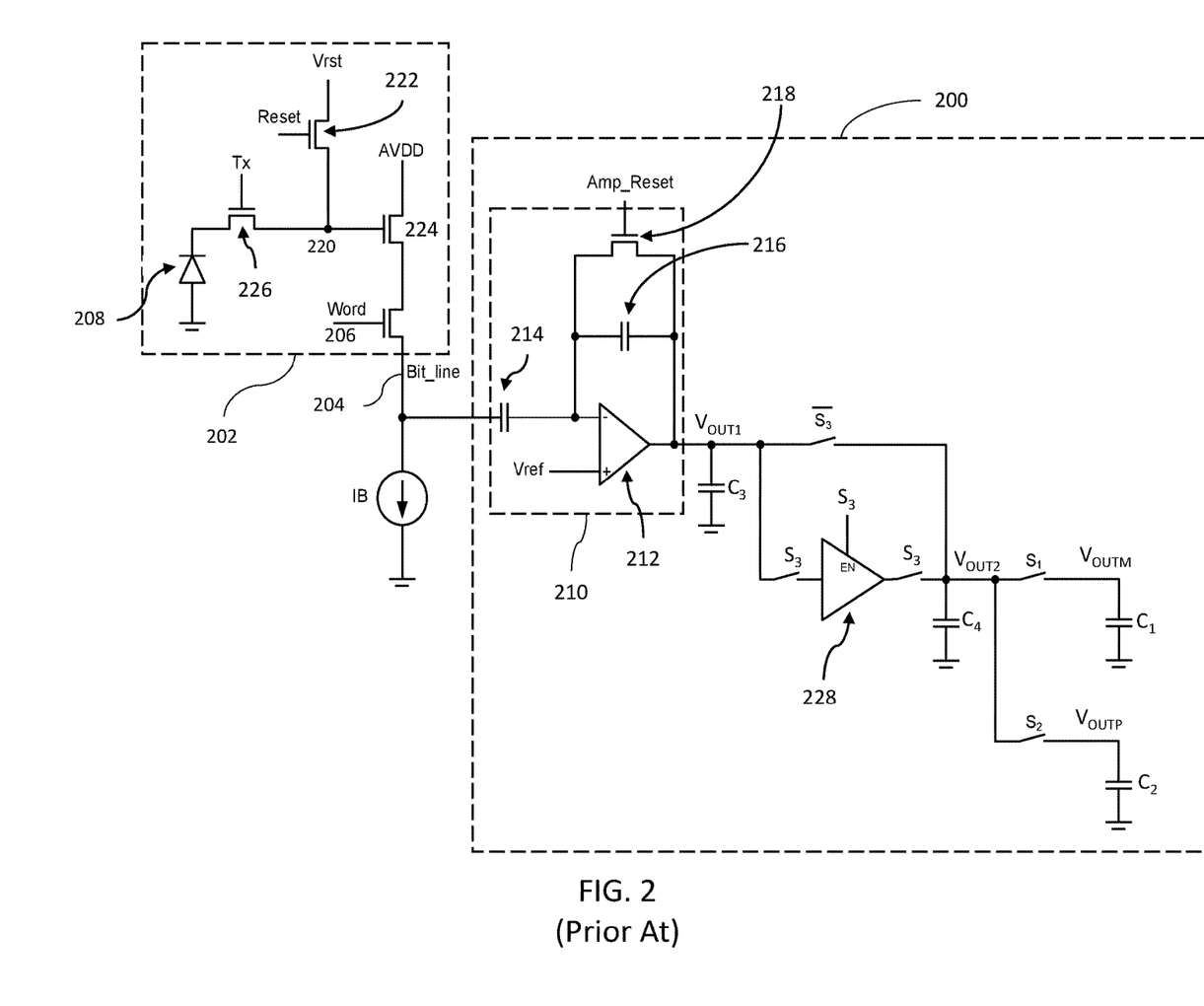
FIG. 2 is a circuit diagram illustrating an example of a prior art column readout amplifier coupled to one pixel sensor in a column of pixel sensors.

The manner in which a column readout amplifier according to embodiments disclosed herein provides advantages may be more easily understood with reference to FIG. 2, which illustrates a prior art column readout amplifier 200 connected to one pixel sensor 202 (e.g., one of the pixel sensors 112) in a column of pixel sensors. The particular pixel sensor 202 that is connected to bit line 204 is determined by the signal on a corresponding word line 206. The column readout amplifier 200 includes a capacitive transimpedance amplifier 210 that includes an operational amplifier 212, an input capacitor 214 coupled to one input of the operational amplifier 212, and a feedback capacitor 216. Prior to measuring the voltage on bit line 204, the input and output of capacitive transimpedance amplifier 210 are shorted by closing the switch 218 to reset the amplifier. The gain of the capacitive transimpedance amplifier 210 is given by the ratio of the capacitances of capacitors 214 and 216, which is typically of the order of about 30. The bandwidth of the capacitive transimpedance amplifier 210 is set by a capacitor $C_3$.

Figure 3:
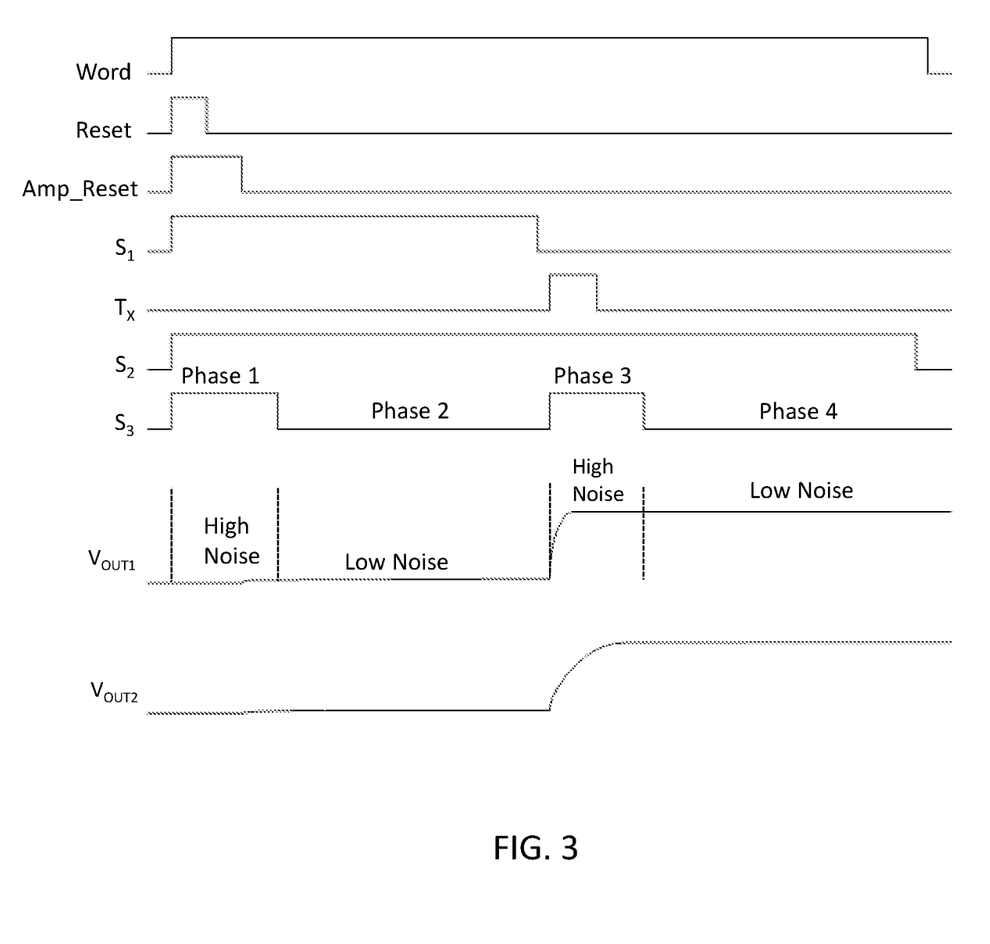
FIG. 3 is a timing diagram for various signals that control certain elements of the readout of the pixel sensor shown in FIG. 2.

FIG. 3 is a timing diagram for various signals associated with a readout operation of the pixel sensor 202 using the column amplifier 200.

Referring to FIGS. 2 and 3, the pixel sensor 202 includes a photodiode 208 that accumulates charge during the image exposure. At the end of the image exposure, a floating diffusion node 220 is reset to a voltage Vrst by closing gate 222 using a signal on a reset line (Reset). The voltage on the floating diffusion node 220 after the reset operation is measured via a source follower 224 and the column readout amplifier 200, and is stored in a sample and hold circuit on a capacitor $C_1$ in the column readout amplifier 200. After this voltage measurement, gate 226 is placed in a conducting state in response to a signal on Tx. The positive potential on the floating diffusion node 220 causes all of the charge on the photodiode 208 to be transferred to the floating diffusion node 220. The transferred charge results in a decrease in the potential of the floating diffusion node 220 relative to the reset potential. The potential on the floating diffusion node 220 is then measured by column readout amplifier 200 and stored in the sample and hold circuit on a capacitor $C_2$. The difference in voltage on capacitors $C_1$ and $C_2$ is then used to determine the charge that was generated by photodiode 208 during the exposure.

A readout operation using the column amplifier 200 can be viewed as occurring in four phases, as shown in FIG. 3. During Phase 1 ($S_1$=High, $S_2$=High, $S_3$=High, $\overline{s_3}$=Low), the capacitive transimpedance amplifier 210 is connected to the capacitor $C_3$ and the output of the capacitive transimpedance amplifier 210 ($V_{out1}$) is routed to a buffer amplifier 228 which charges a filter capacitor $C_4$. With the gain of the buffer amplifier 228 equal to 1 ($G_b$=1), the buffer amplifier output voltage, $V_{out2}$, follows the voltage $V_{out1}$. When the voltage $V_{out2}$ settles, its value is given by:

$$V_{out2} = V_{out1} + V_{os} \quad (1)$$

where $V_{os}$ is the buffer amplifier offset voltage. If the value of $C_3$ is low (small capacitance), the bandwidth of the capacitive transimpedance amplifier 210 may be relatively high, which results in high readout noise in this phase. In addition, the noise level at $V_{out2}$ may be considerably increased relative to the noise level at $V_{out1}$ due to the high current gain associated with the buffer amplifier 228.

To start Phase 2, the switches $S_3$ transition from High to Low and the switch $\overline{s_3}$ goes from Low to High, as shown in FIG. 3. During Phase 2 ($S_1$=High, $S_2$=High, $S_3$=Low, $\overline{s_3}$=High), the capacitive transimpedance amplifier 210 is connected to the capacitors $C_1$, $C_2$, $C_3$, and $C_4$. Because the gain of the buffer amplifier 228 is equal to 1, the buffer amplifier 228 can drive a large capacitance, which allows $C_4$ to be much larger than any of $C_1$, $C_2$, and $C_3$. As a result, the bandwidth of the capacitive transimpedance amplifier 210 is reduced due to the increased capacitance, particularly if $C_4$ is large. Hence, the readout noise may be reduced in this phase. In addition, in Phase 2 the switches $S_3$ are open, disconnecting the buffer amplifier 228. Therefore, $V_{out1}=V_{out2}$ because the buffer amplifier offset voltage, $V_{os}$, is removed.

The operation of the circuit of FIG. 2 in Phase 3 and Phase 4 is similar to that in Phase 1 and Phase 2, respectively. A difference is that $S_1$ is Low and the photocharge from the photodiode 208 is transferred to the floating diffusion node 220 by the Tx gate 226, as discussed above. During Phase 2 and Phase 4, the buffer amplifier 228 can be turned off for power saving. Towards the end of Phase 4, when $S_2$ goes from High to Low, the readout output is given by:

$$V_{out} = V_{outp} - V_{outm} \quad (2)$$

(i.e.,) the difference in voltage on capacitors $C_1$ and $C_2$, as discussed above.

There are several drawbacks associated with the column amplifier 200 of FIG. 2, including a persisting problem of high readout noise, particularly at higher readout frame rates. As discussed above, keeping $C_3$ small to achieve high bandwidth, which may be necessary for high frame rates, results in high readout noise during Phase 1. While the readout noise in Phase 2 may be reduced by using a large value capacitor for $C_4$, this reduces the bandwidth of the capacitive transimpedance amplifier 210 which limits the frame rate. Thus, for operation at high frame rates, it may be necessary to keep $C_4$ small, and as a result, the readout noise is still high.

Figure 4:
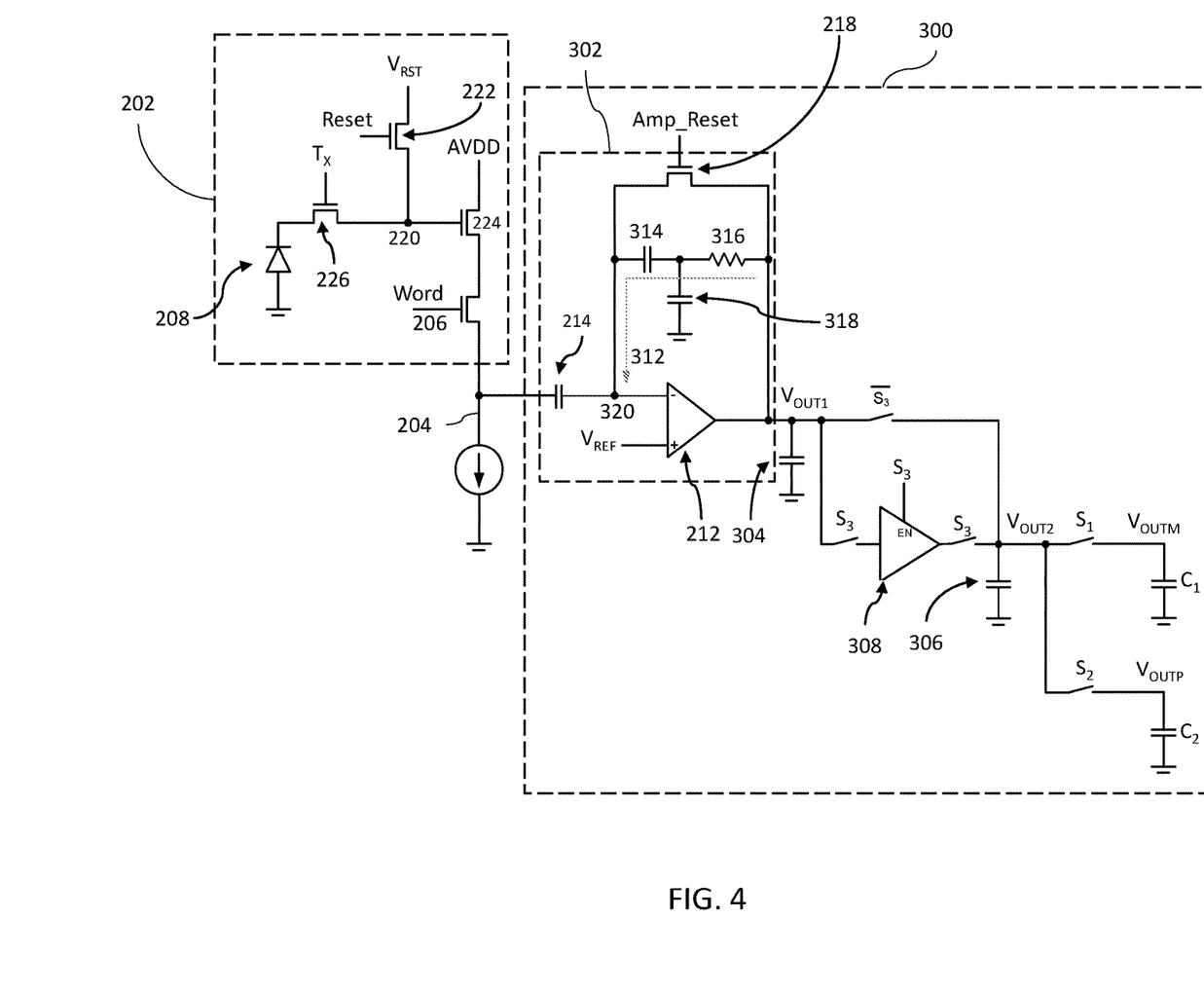
FIG. 4 is a circuit diagram illustrating an example of a column readout amplifier coupled to one pixel sensor in a column of pixel sensors, in accordance with aspects of the present disclosure.

Accordingly, aspects and embodiments address these drawbacks, and provide a column readout amplifier that may operate with reduced readout noise compared to the column amplifier 200, particularly at high frame rates, with the same power consumption. FIG. 4 is a circuit diagram of one example of a column readout amplifier 300 according to aspects of this disclosure. For simplicity, those elements of the column readout amplifier 300 that serve functions analogous to those shown in FIG. 2 for the column readout amplifier 200 have been given the same numerical designations and are not further discussed in detail. Further the signal timing of the column readout amplifier 300 is the same as that shown in FIG. 3 for the column readout amplifier 200 and is therefore not discussed further below.

Referring to FIG. 4, the column readout amplifier 300 is shown coupled to the pixel sensor 202 and configured to read out a voltage corresponding to the photocharge accumulated by the pixel sensor 202, as discussed above. The column readout amplifier 300 includes a signal amplifier 302, which in the illustrated example, is a capacitive transimpedance amplifier. The gain of the signal amplifier 302 ($G_a$) is greater than one. The output of the signal amplifier is coupled to a first terminal of a first capacitor 304, and switchably coupled to a first terminal of a filter capacitor 306 either directly (when switches $S_3$ are open and switch $\overline{s_3}$ is closed) or via a buffer amplifier 308 (when switches $S_3$ are closed and switch $\overline{s_3}$ is open), similar to the arrangement discussed above with reference to FIGS. 2 and 3. The second terminals of the capacitors 304 and 306 are coupled to ground. The voltage, $V_{out2}$, is read out via an analog memory (sample and hold circuit) with capacitors $C_1$ and $C_2$, as discussed above. In certain examples, using the pair of capacitors $C_1$ and $C_2$ for correlated double sampling (CDS), as discussed above, helps to reduce low frequency noise.

The buffer amplifier 308 may be a unitary gain amplifier (i.e., having a gain, $G_b$, that is approximately equal to 1, within a reasonable tolerance). Accordingly, when the buffer amplifier 308 is coupled to the output of the signal amplifier 302, the voltage $V_{out2}$ follows the voltage $V_{out1}$, as discussed above. Differences between the voltage $V_{out2}$ and the voltage $V_{out1}$ may occur as a result of noise from the buffer amplifier 308, the buffer amplifier offset voltage, $V_{os}$, and any small differences in the gain of the buffer amplifier 308 relative to a gain of 1. In general, the gain of buffer amplifier 308 is set to be substantially equal to 1. The amount by which the gain can differ from one depends on the degree of mismatch of the potential on the filter capacitor 306 that can be tolerated. Any mismatch may result in an increase in the time needed for the voltage across the filter capacitor 306 to reach $V_{out1}$ after the switches $S_3$ are opened, with the amount of additional time generally being dependent on the specific application. The buffer amplifier 308 operates to accelerate the charge rate of the filter capacitor 306 during phases of the readout operation when the buffer amplifier is coupled to the output of the signal amplifier 302 (i.e., switches $S_3$ are closed and switch $\overline{s_3}$ is open).

In certain examples, the filter capacitor 306 may have a variable capacitance that can be made larger or smaller, depending on the application and current operating mode of the column readout amplifier 300. For example, in circumstances in which the readout operations have a relatively low frame rate (e.g., around 30 fps), the capacitance of the filter capacitor 306 can be made large so as to reduce the readout noise since the bandwidth of the signal amplifier 302 can be reduced for lower speed readouts. As discussed above, the unit gain buffer amplifier 308 may be capable of driving a high capacitance, thereby allowing the capacitance value of the filter capacitor 306 to be made significantly larger than that of $C_1$, $C_2$, and/or the capacitor 304. In circumstances in which the readout operations have high frame rates, and therefore a higher bandwidth is needed for the signal amplifier 302, the capacitance of the filter capacitor 306 can be reduced. The variable capacitance value may be achieved by implementing the capacitor 306 using one or more variable capacitors and/or one or more switchable, fixed-value capacitors that can be switchably coupled and decoupled to produce a desired combined capacitance value.

As discussed above, in certain examples, the capacitor 304 may be selected to have a very small capacitance so that the signal amplifier 302 has high bandwidth, which may be needed for readout operations with high frame rates. Further, configuring the capacitor 304 to have a very small capacitance value may advantageously help the output voltage from the signal amplifier 302, $V_{out1}$, settle faster, even when the amplifier gain is quite high (e.g., $G_a \approx 32$). Faster settling time also allows the readout operations to occur at higher frame rates. However, as discussed above, the use of a small capacitor 304, along with a small filter capacitor 306 for high frame rate readout operations, can result in high readout noise.

To mitigate this problem, the column readout amplifier 300 includes a low-pass filter in the feedback path (indicated by arrow 312) of the signal amplifier 302. In FIG. 4, the signal amplifier 302 is shown in a high gain mode, with the gain, $G_a$, given by the ratio of the capacitances of the input capacitor 214 ($C_{in}$) and the capacitor 314 (Cf) connected in series in the feedback path 312 ($G_a = C_{in}/C_f$). In certain examples, the gain, $G_a$, may be approximately 30, for example, 32. The low-pass filter includes a series resistor 316 that is connected in series with the capacitor 314 and a shunt capacitor 318 that is connected between a node between the series resistor 316 and the capacitor 314 and ground, as shown. By adding the low-pass filter 316, 318 in the feedback path, the noise effect of the amplifier output voltage $V_{out1}$ to the summing node 320 ($V_{in}$) is reduced. In other words, the low-pass filter 316, 318 helps to reduce the total noise at the node 320, which in turn helps to reduce the noise at the amplifier output $V_{out1}$ in the forward path.

According to certain examples, to maintain the power consumption and amplifier slew rate of the signal amplifier 302, the capacitance of the shunt capacitor 318 forming part of the low-pass filter is much smaller than the capacitance of the filter capacitor 306. In one example, the capacitance of the shunt capacitor 318 is in a range of about 0.1 to 0.5 picofarads (pF), for example, 0.15 pF, and the series resistor 316 has a resistance of approximately 200 kiloOhms (KΩ). The low-pass filter 316, 318 can help to reduce the readout noise at $V_{out2}$ by about 10% (relative to the column readout amplifier 200) at a readout frame rate of 120 fps. At lower frame rates, the noise levels at the voltages $V_{out1}$ and $V_{out2}$ may be lower because the capacitance value of the filter capacitor 306 can be quite large, as discussed above. However, the addition of the low-pass filter 316, 318 still operates to reduce the noise relative to the column readout amplifier 200. For example, the low-pass filter 316, 318 can help to reduce the readout noise at $V_{out2}$ by about 5% (relative to the column readout amplifier 200) at a readout frame rate of 30 fps. Simulations have confirmed the reduced readout noise of the column readout amplifier 300 relative to the column readout amplifier 200 under the same conditions.

Figure 5:
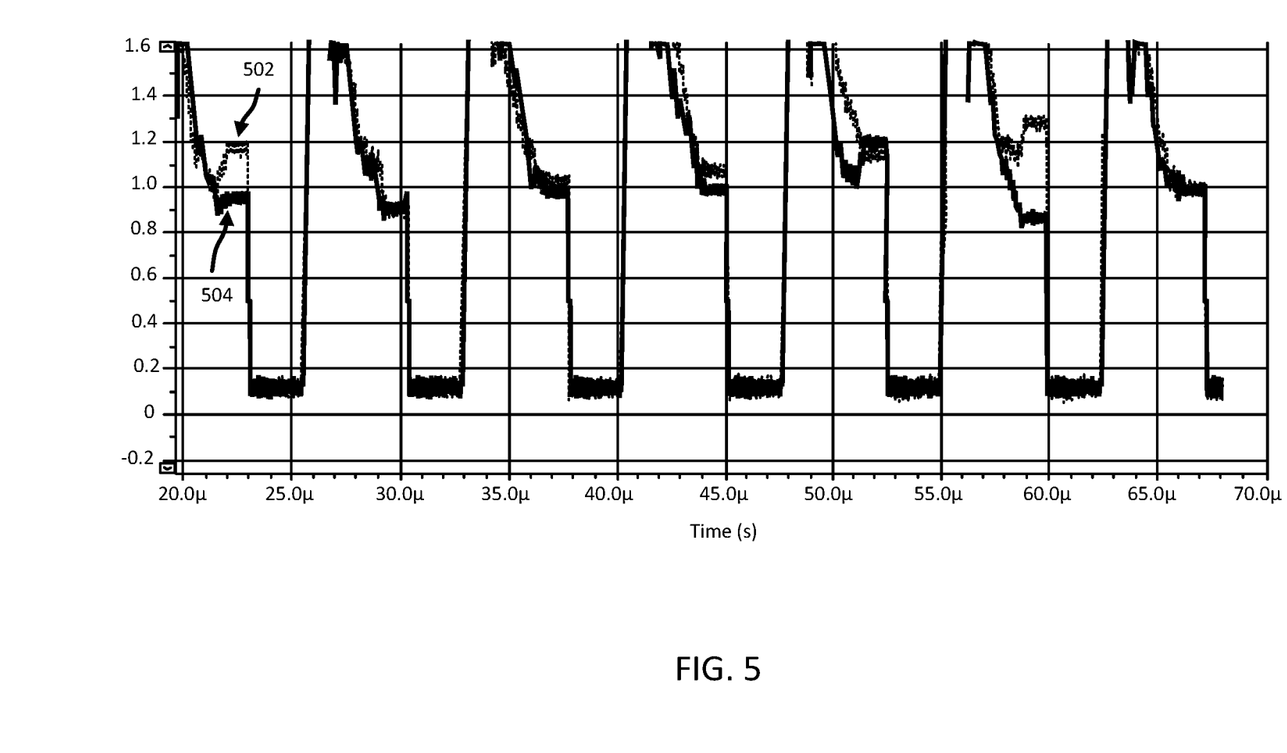
FIG. 5 is a comparative graph showing an example of simulated noise measurements for readouts from the circuit of FIG. 2 and the circuit of FIG. 4, according to aspects of the present disclosure.

FIG. 5 is a graph showing noise simulation results at 120 fps for an example of the column readout amplifier 200 (curve 502) and an example of the column readout amplifier 300 (curve 504) under the same conditions. It can be seen that the readout noise associated with the column readout amplifier 300 is reduced relative to the readout noise associated with the column amplifier 200.

Thus, aspects and embodiments provide a column readout amplifier that helps to reduce the readout noise at high frame rates without increasing power consumption. Embodiments of the column readout amplifier 300 may be used as the column readout amplifier 120 in the image sensor 100 to allow the image sensor to operate with lower noise and thus higher sensitivity, which may be advantageous in many applications, particularly in low-light imaging applications.

Example Computing Platform

Figure 6:
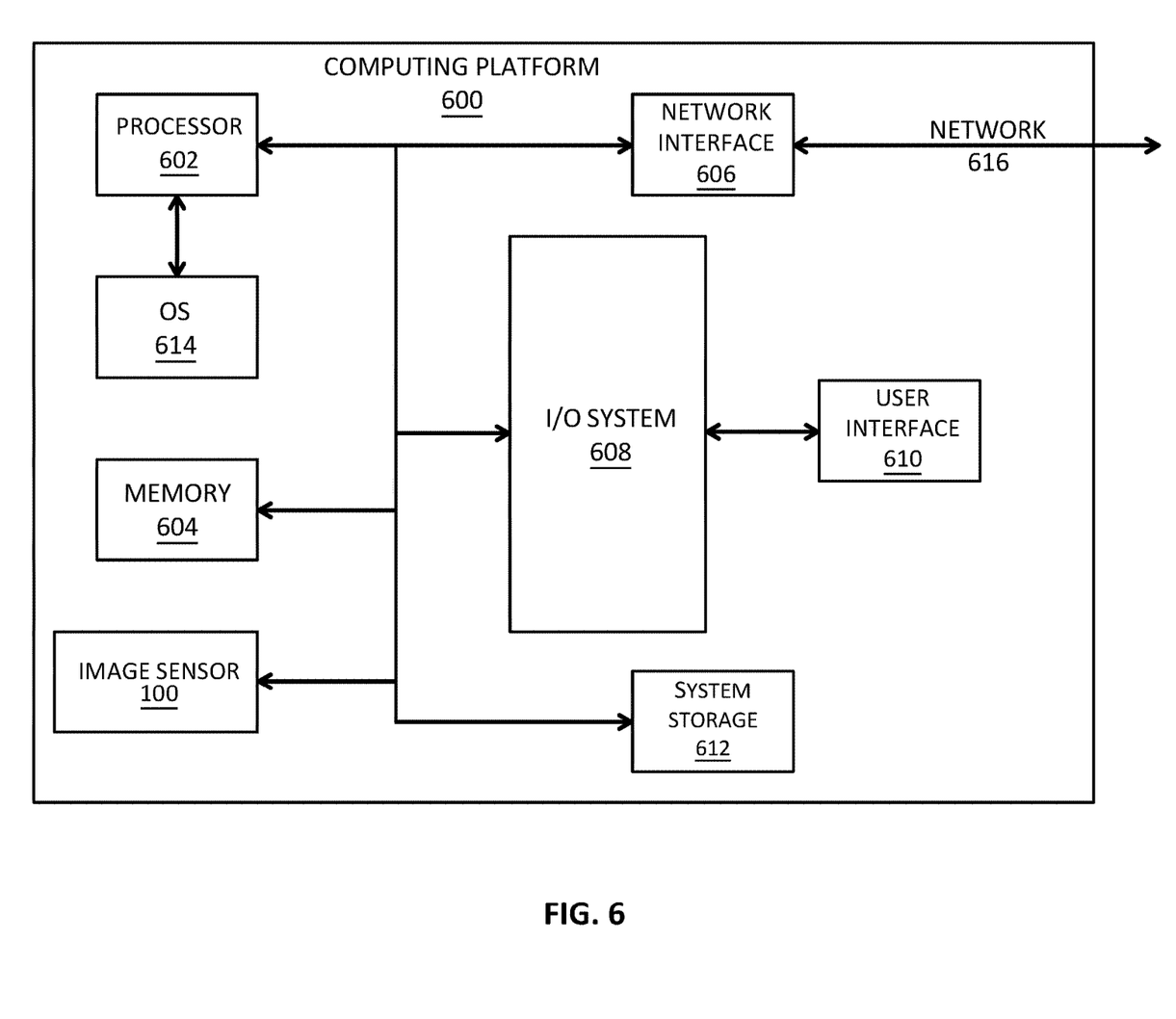
FIG. 6 is a block diagram of one example of a computing platform that may include the image sensor of FIG. 1, in accordance with aspects of the present disclosure.

FIG. 6 illustrates an example computing platform 600 that interfaces with image sensor 100, configured in accordance with certain embodiments of the present disclosure. In some embodiments, computing platform 600 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. The computing platform 600 may host a controlled area network (CAN) used on board a vehicle. In some embodiments, the computing platform 600 represents one system in a network of systems coupled together via a CAN bus.

In some examples, the computing platform 600 may comprise any combination of a processor 602, a memory 604, an embodiment of the image sensor 100, a network interface 606, an input/output (I/O) system 608, a user interface 610, and a storage system 612. In some embodiments, one or more components of the image sensor 100 are implemented as part of the processor 602. As shown in FIG. 6, a bus and/or interconnect is also provided to allow for communication between the various components listed above and/or other components not shown. The computing platform 600 can be coupled to a network 616 through the network interface 606 to allow for communications with other computing devices, platforms, or resources. Other componentry and functionality not reflected in the block diagram of FIG. 6 will be apparent in light of this disclosure, and it will be appreciated that other embodiments are not limited to any particular hardware configuration.

The processor 602 can be any suitable processor and may include one or more coprocessors or controllers to assist in control and processing operations associated with the computing platform 600. In some embodiments, the processor 602 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. In some examples, the processor 602 may include, or may be part of, the processor 140 discussed above.

The memory 604 can be implemented using any suitable type of digital storage including, for example, flash memory and/or random access memory (RAM). In some embodiments, the memory 604 may include various layers of memory hierarchy and/or memory caches as are known to those of skill in the art. The memory 604 may be implemented as a volatile memory device such as, but not limited to, a RAM, dynamic RAM (DRAM), or static RAM (SRAM) device. The storage system 612 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, the storage system 612 may comprise technology to increase the storage performance enhanced protection for valuable digital media when multiple hard drives are included.

The processor 602 may be configured to execute an Operating System (OS) 614 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with the computing platform 600, and therefore may also be implemented using any suitable existing or subsequently-developed platform.

The network interface 606 can be any appropriate network chip or chipset which allows for wired and/or wireless connection between other components of the computing platform 600 and/or the network 616, thereby enabling the computing platform 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

The I/O system 608 may be configured to interface between various I/O devices and other components of the computing platform 600. I/O devices may include, but not be limited to, a user interface 610. The user interface 610 may include devices (not shown) such as a display element, touchpad, keyboard, mouse, and speaker, etc. The I/O system 608 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into the processor 602 or any chipset of the computing platform 600.

It will be appreciated that in some embodiments, the various components of the computing platform 600 may be combined or integrated in a system-on-a-chip (SoC) architecture. In some embodiments, the components may be hardware components, firmware components, software components or any suitable combination of hardware, firmware or software.

In various embodiments, the computing platform 600 may be implemented as a wireless system, a wired system, or a combination of both. When implemented as a wireless system, the computing platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, the computing platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

ADDITIONAL EXAMPLES

Example 1 is a column readout amplifier comprising: a signal amplifier having an amplifier output, a first amplifier input, and a second amplifier input, the second amplifier input terminal being connected to a reference voltage terminal; a filter capacitor having first and second terminals, the second terminal being connected to a ground terminal; a buffer amplifier having a buffer amplifier input and a buffer amplifier output; a switching network configured to switchably connect the amplifier output to the buffer amplifier input and the buffer amplifier output to the first terminal of the filter capacitor during a first time period, and to switchably connect the amplifier output terminal directly to the first terminal of the filter capacitor during a second time period; and a low-pass filter connected in a feedback path of the signal amplifier between the amplifier output and the first amplifier input, the low-pass filter including a series resistor and a capacitor.

Example 2 includes the column readout amplifier of Example 1, further comprising a capacitor connected between the amplifier output and the ground terminal.

Example 3 includes the column readout amplifier of one of Examples 1 and 2, further comprising a feedback capacitor connected in series with the series resistor in the feedback path of the signal amplifier.

Example 4 includes the column readout amplifier of Example 3, wherein the signal amplifier comprises a capacitive transimpedance amplifier configured with a gain greater than one.

Example 5 includes the column readout amplifier of one of Examples 3 and 4, wherein the capacitor is connected between a node between the series resistor and the feedback capacitor and the ground terminal.

Example 6 includes the column readout amplifier of any one of Examples 1-5, wherein a capacitance of the capacitor is smaller than a capacitance of the filter capacitor.

Example 7 includes the column readout amplifier of Example 6, wherein the capacitance of the filter capacitor is variable.

Example 8 includes the column amplifier of any one of Examples 1-7, wherein the buffer amplifier output is disconnected from the filter capacitor during the second time period.

Example 9 includes the column readout amplifier of any one of Examples 1-8, wherein the buffer amplifier has a gain substantially equal to one.

Example 10 includes the column amplifier of any one of Examples 1-9, further comprising an input capacitor connected to the first input of the signal amplifier.

Example 11 is an image sensor comprising: a bit line conductor; a pixel array having at least one column of addressable pixel sensors, each pixel sensor being coupled to the bit line conductor in response to a word select signal; and a column amplifier connected to the bit line conductor, the column amplifier comprising a signal amplifier having an amplifier output, a first amplifier input, and a second amplifier input, the second amplifier input being connected to a reference voltage terminal; a filter capacitor having first and second terminals, the second terminal being connected to a ground terminal; a buffer amplifier having a buffer amplifier input and a buffer amplifier output; a switching network configured to switchably connect the amplifier output to the buffer amplifier input and the buffer amplifier output to the first terminal of the filter capacitor during a first time period, and to switchably connect the amplifier output directly to the first terminal of the filter capacitor during a second time period; and a low-pass filter connected in a feedback path of the signal amplifier between the amplifier output and the first amplifier input, the low-pass filter including a series resistor and a capacitor.

Example 12 includes the image sensor of Example 11, further comprising a capacitor connected between the amplifier output and the ground terminal.

Example 13 includes the image sensor of one of Examples 11 and 12, further comprising a feedback capacitor connected in series with the series resistor in the feedback path of the signal amplifier.

Example 14 includes the image sensor of Example 13, wherein the signal amplifier comprises a capacitive transimpedance amplifier configured with a gain greater than one.

Example 15 includes the image sensor of one of Examples 13 and 14, wherein the capacitor is connected between a node between the series resistor and the feedback capacitor and the ground terminal.

Example 16 includes the image sensor of any one of Examples 11-15, wherein a capacitance of the capacitor is smaller than a capacitance of the filter capacitor.

Example 17 includes the image sensor of Example 16, wherein the capacitance of the filter capacitor is variable.

Example 18 includes the image sensor of any one of Examples 11-17, wherein the buffer amplifier output is disconnected from the filter capacitor during the second time period.

Example 19 includes the image sensor of any one of Examples 11-18, wherein the buffer amplifier has a gain substantially equal to one.

Example 20 includes the image sensor of any one of Examples 11-19, further comprising an input capacitor connected to the first input of the signal amplifier.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings of various embodiments are presented by way of example only. These examples are not intended to be exhaustive or to limit the invention to the precise forms disclosed. The methods and apparatuses are capable of implementation in other embodiments and of being practiced or of being carried out in various ways. In addition, the phraseology and terminology used herein is for the purpose of description and should not be regarded as limiting. Any references to examples, components, elements, or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms. The scope of the invention should be determined from proper construction of the appended claims, and their equivalents.

What is claimed is:

1. A column readout amplifier comprising:
   a signal amplifier having an amplifier output, a first amplifier input, and a second amplifier input, the second amplifier input being connected to a reference voltage terminal;
   a filter capacitor having first and second terminals, the second terminal being connected to a ground terminal;
   a buffer amplifier having a buffer amplifier input and a buffer amplifier output;
   a switching network configured to switchably connect the amplifier output to the buffer amplifier input and the buffer amplifier output to the first terminal of the filter capacitor during a first time period, and to switchably connect the amplifier output directly to the first terminal of the filter capacitor during a second time period; and
   a low-pass filter connected in a feedback path of the signal amplifier between the amplifier output and the first amplifier input, the low-pass filter including a series resistor and a capacitor.

2. The column readout amplifier of claim 1, further comprising a capacitor connected between the amplifier output and the ground terminal.

3. The column readout amplifier of claim 1, further comprising a feedback capacitor connected in series with the series resistor in the feedback path of the signal amplifier.

4. The column readout amplifier of claim 3, wherein the signal amplifier comprises a capacitive transimpedance amplifier configured with a gain greater than one.

5. The column readout amplifier of claim 3, wherein the capacitor is connected between a node between the series resistor and the feedback capacitor and the ground terminal.

6. The column readout amplifier of claim 1, wherein a capacitance of the capacitor is smaller than a capacitance of the filter capacitor.

7. The column readout amplifier of claim 6, wherein the capacitance of the filter capacitor is variable.

8. The column readout amplifier of claim 1, wherein the buffer amplifier output is disconnected from the filter capacitor during the second time period.

9. The column readout amplifier of claim 1, wherein the buffer amplifier has a gain substantially equal to one.

10. The column readout amplifier of claim 1, further comprising an input capacitor connected to the first input of the signal amplifier.

11. An image sensor comprising:
    a bit line conductor;
    a pixel array having at least one column of addressable pixel sensors, each pixel sensor being coupled to the bit line conductor in response to a word select signal; and
    a column amplifier connected to the bit line conductor, the column amplifier comprising
    a signal amplifier having an amplifier output, a first amplifier input, and a second amplifier input, the second amplifier input being connected to a reference voltage terminal;

a filter capacitor having first and second terminals, the second terminal being connected to a ground terminal;

a buffer amplifier having a buffer amplifier input and a buffer amplifier output;

a switching network configured to switchably connect the amplifier output to the buffer amplifier input and the buffer amplifier output to the first terminal of the filter capacitor during a first time period, and to switchably connect the amplifier output directly to the first terminal of the filter capacitor during a second time period; and a low-pass filter connected in a feedback path of the signal amplifier between the amplifier output and the first amplifier input, the low-pass filter including a series resistor and a capacitor.

12. The image sensor of claim 11, further comprising a capacitor connected between the amplifier output and the ground terminal.

13. The image sensor of claim 11, further comprising a feedback capacitor connected in series with the series resistor in the feedback path of the signal amplifier.

14. The image sensor of claim 13, wherein the signal amplifier comprises a capacitive transimpedance amplifier configured with a gain greater than one.

15. The image sensor of claim 13, wherein the capacitor is connected between a node between the series resistor and the feedback capacitor and the ground terminal.

16. The image sensor of claim 11, wherein a capacitance of the capacitor is smaller than a capacitance of the filter capacitor.

17. The image sensor of claim 16, wherein the capacitance of the filter capacitor is variable.

18. The image sensor of claim 11, wherein the buffer amplifier output is disconnected from the filter capacitor during the second time period.

19. The image sensor of claim 11, wherein the buffer amplifier has a gain substantially equal to one.

20. The image sensor of claim 11, further comprising an input capacitor connected to the first input of the signal amplifier.

* * * * *